United States Patent
Marchi et al.

(10) Patent No.: US 10,016,087 B2
(45) Date of Patent: Jul. 10, 2018

(54) COFFEE GRINDER AND COFFEE MACHINE CONTAINING A COFFEE GRINDER

(71) Applicants: KONINKLIJKE PHILIPS N.V., Eindhoven (NL); KONINKLIJKE DOUWE EGBERTS B.V., Utrecht (NL)

(72) Inventors: Marco Marchi, Eindhoven (NL); Cesare Lenzi, Eindhoven (NL); Andrea Pecci, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 374 days.

(21) Appl. No.: 14/429,188

(22) PCT Filed: Sep. 20, 2013

(86) PCT No.: PCT/IB2013/058688
§ 371 (c)(1),
(2) Date: Mar. 18, 2015

(87) PCT Pub. No.: WO2014/045230
PCT Pub. Date: Mar. 27, 2014

(65) Prior Publication Data
US 2015/0238040 A1    Aug. 27, 2015

(30) Foreign Application Priority Data
Sep. 21, 2012  (EP) ..................................... 12185368

(51) Int. Cl.
A47J 31/42  (2006.01)
A47J 42/16  (2006.01)
A47J 42/40  (2006.01)

(52) U.S. Cl.
CPC ............... *A47J 31/42* (2013.01); *A47J 42/16* (2013.01); *A47J 42/40* (2013.01)

(58) Field of Classification Search
CPC ............. A47J 31/42; A47J 42/40; A47J 42/16
See application file for complete search history.

(56) References Cited

U.S. PATENT DOCUMENTS

| | | | | |
|---|---|---|---|---|
| 1,502,675 A | * | 7/1924 | Johnston ................. | A47J 42/16 241/32 |
| 2,229,031 A | * | 1/1941 | Anderson ............... | A47J 42/16 241/257.1 |

(Continued)

FOREIGN PATENT DOCUMENTS

| CH | 322964 A | 7/1957 |
|---|---|---|
| CH | 322974 A | 7/1957 |

(Continued)

*Primary Examiner* — Sean Michalski

(57) ABSTRACT

A method for grinding coffee beans in a coffee machine is described. The method the steps of: arranging a first grinding wheel (55) and a second grinding wheel (57) in a seat (53), the grinding wheels forming a grinding volume there between and rotating one with respect to the other; introducing coffee beans into said grinding volume and grinding the coffee beans by rotating the grinding wheels one with respect to the other. Rotation of the grinding wheels is continued after grinding of the coffee beans, thus removing ground coffee therefrom by centrifugal force.

15 Claims, 9 Drawing Sheets

(56) References Cited

U.S. PATENT DOCUMENTS

| | | | | |
|---|---|---|---|---|
| 2,290,747 | A * | 7/1942 | Henry | A47J 42/40 141/346 |
| 2,852,202 | A * | 9/1958 | Ditting | A47J 42/16 241/100 |
| 2,852,203 | A * | 9/1958 | Ditting | A47J 42/18 241/259 |
| 3,327,615 | A * | 6/1967 | Swan | A47J 31/408 99/282 |
| 4,913,037 | A * | 4/1990 | Newnan | A47J 31/42 241/101.2 |
| 5,158,793 | A * | 10/1992 | Helbling | A47J 31/007 426/231 |
| 5,186,399 | A | 2/1993 | Knepler | |
| 5,228,383 | A * | 7/1993 | Landais | A47J 31/3614 99/289 R |
| 5,285,705 | A * | 2/1994 | Buttle | A47J 31/42 137/624.13 |
| 5,307,733 | A * | 5/1994 | Enomoto | A47J 31/42 241/100 |
| 5,322,005 | A * | 6/1994 | Enomoto | A47J 31/42 241/100 |
| 5,463,934 | A * | 11/1995 | Locati | A47J 31/3614 99/286 |
| 5,865,095 | A * | 2/1999 | Mulle | A47J 31/0573 99/286 |
| 6,321,506 | B1 * | 11/2001 | Rolland | A47J 31/404 53/53 |
| 6,988,444 | B1 * | 1/2006 | Pfeifer | A47J 31/42 99/286 |
| 7,252,033 | B1 * | 8/2007 | Lin | A47J 31/42 241/186.3 |
| 9,510,710 | B1 * | 12/2016 | Kaminski | A47J 42/44 |
| 2003/0010855 | A1 * | 1/2003 | Holcomb | A47J 42/40 241/169 |
| 2006/0222736 | A1 * | 10/2006 | Keller | A47J 31/42 426/45 |
| 2007/0063079 | A1 | 3/2007 | Ford | |
| 2009/0031900 | A1 * | 2/2009 | Barraclough | A47J 31/42 99/280 |
| 2009/0095165 | A1 * | 4/2009 | Nosler | A47J 31/007 99/289 R |
| 2010/0037778 | A1 * | 2/2010 | Remo | A47J 31/42 99/286 |
| 2010/0288777 | A1 * | 11/2010 | White | A47J 31/04 220/592.18 |
| 2012/0001005 | A1 * | 1/2012 | Kroesen | A47J 42/16 241/257.1 |
| 2012/0273600 | A1 * | 11/2012 | Carapelli | A47J 42/08 241/85 |
| 2013/0087644 | A1 * | 4/2013 | Ephraim | B01F 7/001 241/33 |
| 2013/0091802 | A1 * | 4/2013 | Bentley | A47J 42/50 53/111 R |
| 2013/0233176 | A1 * | 9/2013 | Lin | A47J 31/42 99/286 |
| 2014/0060336 | A1 * | 3/2014 | Campetella | A47J 31/42 99/286 |

FOREIGN PATENT DOCUMENTS

| | | |
|---|---|---|
| DE | 29917566 U1 | 12/1999 |
| EP | 2364624 A2 | 9/2011 |
| JP | 11974131385 U1 | 3/1948 |
| JP | 11984067141 U1 | 10/1982 |
| JP | 1986194595 A | 2/1985 |
| JP | 1988135113 A | 11/1986 |
| JP | 1988270014 A | 4/1987 |
| JP | 2012045378 A | 3/2012 |
| WO | 0123095 A1 | 4/2001 |

* cited by examiner

Fig.1 STATE OF THE ART

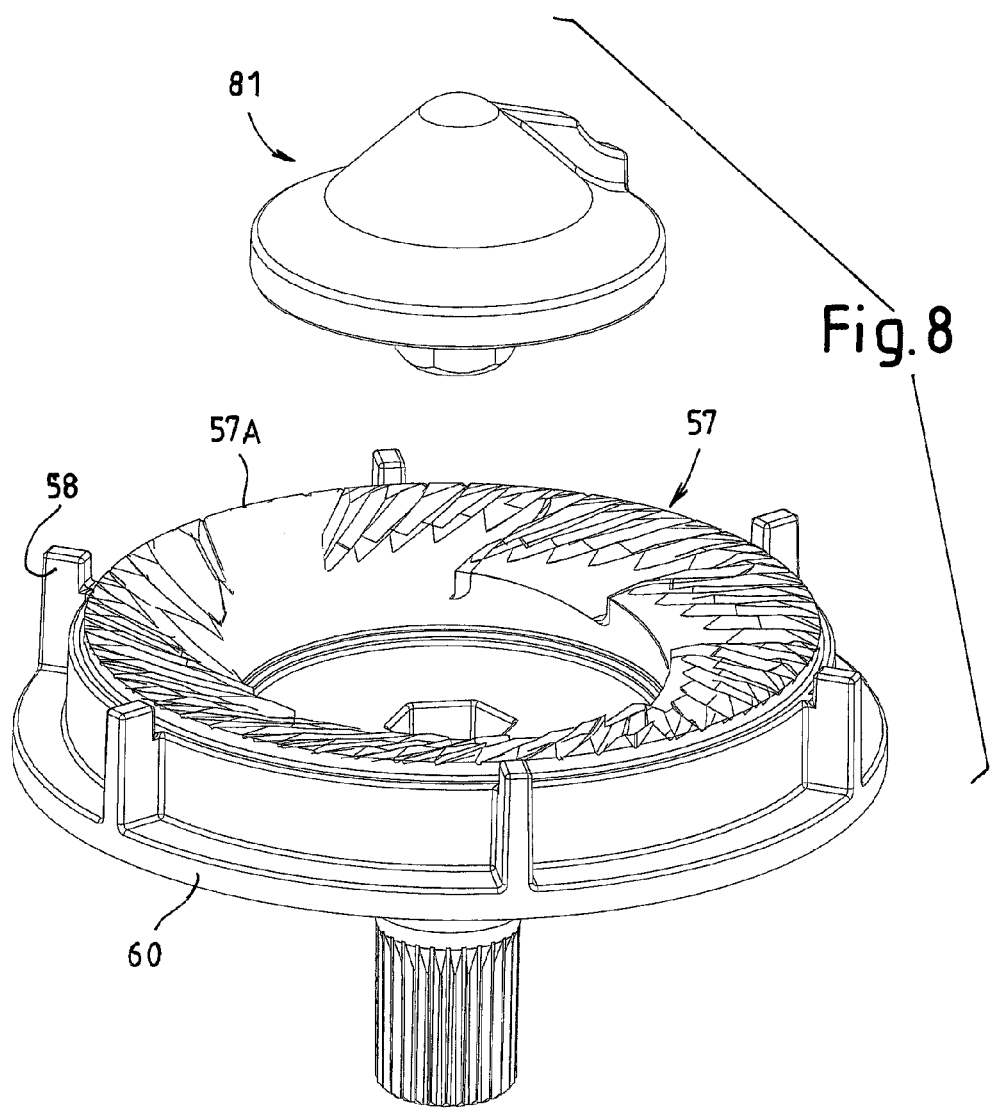

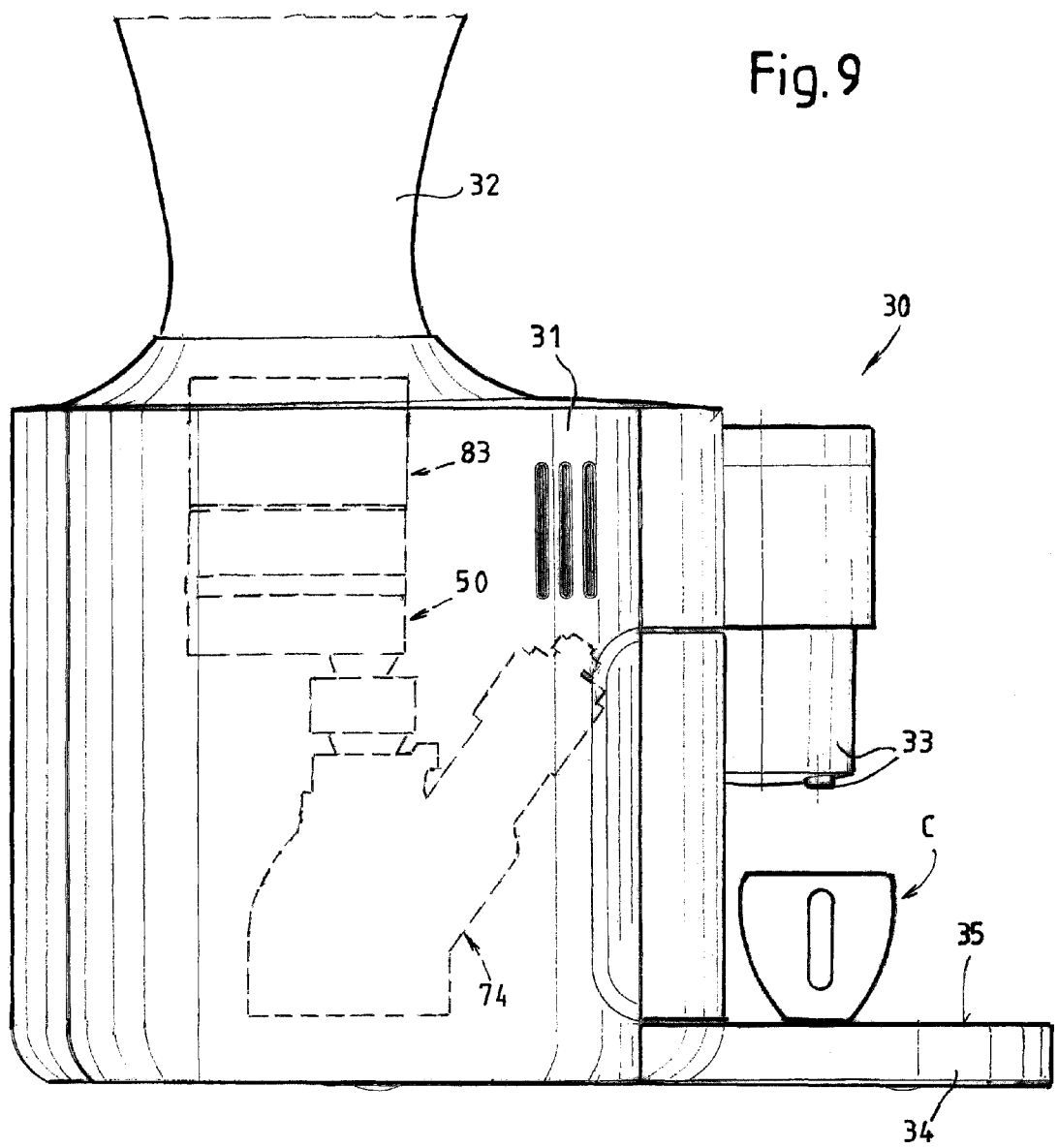

COFFEE GRINDER AND COFFEE MACHINE CONTAINING A COFFEE GRINDER

This application is the U.S. National Phase application under 35 U.S.C. § 371 of International Application No. PCT/IB2013/058688, filed on Sep. 20, 2013, which claims the benefit of European Application No. 12185368.3 filed on Sep. 21, 2012. These applications are hereby incorporated by reference herein.

FIELD OF THE INVENTION

The present disclosure relates to coffee beans grinders, in particular for installation in automatic or semi-automatic coffee machines and the like. The disclosure further refers to a coffee machine including such a coffee-beans grinder.

DESCRIPTION OF THE RELATED ART

Some coffee makers are provided with a coffee grinder for grinding coffee beans dispensed from a coffee beans container to produce ground coffee. The ground coffee in powder form is then loaded in an infusion unit for the preparation of a coffee-based beverage, e.g. espresso, cappuccino, filter coffee, or the like.

Coffee grinders for coffee machines are usually comprised of a first, stationary grinding wheel and a second, rotary grinding wheel. The grinding wheels are arranged one facing the other in order to define a grinding volume there between. The two oppositely arranged grinding wheels are usually provided with broadly conical grinding surfaces provided with grinding teeth. The grinding wheels are usually arranged one on top of the other and an aperture in the upper grinding wheel is provided, for introducing coffee beans into the grinding space or grinding volume defined between the two grinding wheels. The rotation of one grinding wheel with respect to the other crushes the coffee beans producing ground coffee, which is collected in a radially extending outlet channel. The ground coffee is slightly compacted in the outlet channel before being discharged in a ground coffee chute, which dispenses the ground coffee directly into the infusion unit arranged underneath the ground coffee chute.

A grinder of the current art is shown in FIGS. 1 and 2 and will be shortly described here below. FIG. 1 illustrates a section along the rotation axis of the rotary grinding wheel. FIG. 2 illustrates a section according to line II-II of FIG. 1. Reference number 1 indicates the coffee grinder as a whole. The coffee grinder 1 comprises a stationary bearing or supporting structure 3, intended to be mounted in a coffee machine. The structure 3 forms a seat 5 housing a first, upper grinding wheel 7 and a second, lower grinding wheel 9. The first grinding wheel 7 is stationary, while the second, lower grinding wheel 9 is a rotary grinding wheel and can be driven into rotation around a rotation axis A-A by means of an electric motor 11, through a gear 13 mounted on a shaft 15. An auger 17 is also mounted on the shaft 15, to feed coffee beans into the grinding volume 19 formed between the opposite grinding surfaces of the first, stationary grinding wheel 7 and the second, rotary grinding wheel 9. An aperture 27 in the upper, stationary grinding wheel 7 allows the coffee beans to enter the grinding volume 19.

Ground coffee exiting the grinding volume 19 is collected in an outlet channel 21. The outlet channel 21 extends radially from the seat 5, where the grinding wheels 7 and 9 are housed, towards a ground coffee chute. An elastic flap 23 is arranged across the outlet channel 21, so that the ground coffee delivered by the grinding wheels 7, 9 housed in seat 5 is slightly compacted while advancing along the outlet channel 21. The outlet channel 21 ends into a ground coffee chute 23 which is downwardly oriented so as to load the ground coffee into an infusion unit schematically shown at 25 and arranged under the ground coffee chute 23.

In known grinders of this kind coffee beans are usually fed from the top into the central aperture 27 and the coffee beans are caused to advance by gravity and by the rotation of the auger 17, while the grinder 1 is powered. The ground coffee is collected in the outlet channel 21 and fills said channel up to the edge 21A at the end of the channel from where the ground coffee falls by gravity into the coffee chute 23. When the grinder 1 is de-energized, the lower, rotary grinding wheel 9 stops and the already ground coffee filling the grinding volume 19 and the outlet channel 29 remains in the grinder 1 until the subsequent grinding cycle starts.

A grinder of this kind is disclosed for example in US-A-2010/0037778.

These grinders operate fairly satisfactorily but are affected by some drawbacks. In particular, the ground coffee remaining inside the grinder 1 is subject to oxidation due to contact with ambient air. This problem concerns both the coffee remaining in the volume 19 between the two grinding wheels, as well as the ground coffee remaining in the outlet channel 21.

If the coffee machine remains inactive for quite a long time, for example overnight, the quality of the first coffee cup brewed upon resumption of the machine operation can be negatively affected by oxidation of the ground coffee, which took place overnight. The longer the period during which the grinder remains inoperative, the heavier the degradation of the ground coffee. Furthermore, if the user desires to change the quality of the coffee beans used, for example replacing regular coffee with decaffeinated coffee, at least the first coffee cup dispensed by the coffee machine will be prepared at least partly with the old coffee quality previously contained in the coffee container, since ground coffee produced by grinding the old coffee quality previously present in the machine is still contained in the grinding volume 19 and in the outlet channel 21.

A need, therefore, exists for an improved grinder which alleviates or overcomes one or more of the above mentioned drawbacks.

SUMMARY OF THE INVENTION

To remove or at least alleviate at least one of the problems arising from the use of the prior art grinders, a coffee grinder according to claim 1, a coffee machine according to claim 10, and a grinding method according to claim 12 are provided.

The method for grinding coffee beans in a coffee machine is provided; said method comprises the steps of:

arranging a first grinding wheel and a second grinding wheel in a seat, said first grinding wheel and said second grinding wheel forming a grinding volume there between and rotating one with respect to the other;

introducing coffee beans into said grinding volume;

grinding said coffee beans by rotating said first grinding wheel and second grinding wheel one with respect to the other;

continuing rotation of said first grinding wheel and said second grinding wheel one with respect to the other thus cleaning said grinding volume and said seat, removing ground coffee therefrom by centrifugal force.

In practical embodiments, the grinding wheels are kept in relative rotary movement for a time sufficient to crush all the coffee beans delivered in the grinding volume, thus entirely transforming the coffee beans into coffee powder, and to remove by centrifugal force the ground coffee from the grinding volume between the grinding wheels and from the seat where the grinding wheels are arranged. This grinding process results in the grinder remaining substantially free of coffee residues. If the coffee machine and the grinder remain inactive for a relatively long period of time, e.g. overnight, the next grinding and infusion cycles performed after the period of non-use of the machine will be carried out using fresh coffee beans and substantially no (or a negligible amount of) oxidized or partly oxidized or deteriorated ground coffee from previous grinding cycles will adversely affect the taste of the coffee beverage.

The side surface of the ground-coffee outlet opening is oriented to facilitate projection of ground coffee from the grinding volume and from the seat by effect of centrifugal force into a ground-coffee chute.

Mutual rotation of the first and second grinding wheels is controlled so that once the coffee beans fed to the grinding wheel are exhausted, rotation is continued to clean the grinding volume and the seat of the grinding wheels, thus removing residual ground coffee by centrifugal force.

If the user desires to change the coffee beans quality, e.g. shifting from regular coffee to decaffeinated coffee, the first cup of coffee brewed with the new coffee quality will contain substantially no residues, or only negligible residues, of the previously used quality.

According to some embodiments, the method can comprise the following steps: feeding a metered amount of coffee beans in the grinding volume; rotating the first grinding wheel and the second grinding wheel one with respect to the other to grind said metered amount of coffee beans; continuing rotation to remove ground coffee from said seat and said grinding volume by centrifugal force.

Rotation of the grinding wheel(s) can stop after a predetermined time interval, which is calculated such that the maximum possible metered amount of coffee will be completely ground and the ground coffee will be removed from the grinder. Since the amount of coffee beans used for a grinding cycle and an infusion cycle is determined by the amount of ground coffee required for the infusion of one or two coffee cups, the pre-set time interval can be calculated so that the number of revolutions performed by the rotating grinding wheel is sufficient to grind twice the maximum amount of coffee beans usable for the preparation of a cup of coffee. This amount is set by the mechanical features of the infusion unit. An extra grinding time can be added, to allow the grinder rotating under no-load conditions, to ensure that residues of ground coffee are properly removed from the grinding volume and the seat of the grinding wheels.

In other embodiments, means can be provided to detect the actual exhaustion of the coffee beans in the grinding volume. The rotary motion of the grinder can then be maintained for a certain amount of extra-time following the detected exhaustion of the coffee beans. Some possible ways of detecting the completion of the grinding process will be set forth later on.

In preferred embodiments, a coffee-beans metering device can be arranged above the coffee grinder.

Substantially tangent shall be understood to be an orientation which is exactly or nearly tangent to the cylindrical wall, such that the ground coffee will be easily projected out of the seat where the grinding wheels are arranged. According to some embodiments, substantially tangent means that the side surface forms an angle between −10° and +40° with the tangent direction and preferably between −5° and +20° and even more preferably between −5° and +10°. In currently preferred embodiments the side surface is tangent to the cylindrical surface of the grinding wheels seat.

The tangent or substantially tangent orientation of the side surface is such that the speed vector of the ground coffee projecting from the grinding volume due to centrifugal force is oriented concordant or approximately concordant to the orientation of the side surface. This assists ejection of the ground coffee from the grinding volume and from the seat of the grinding wheels, making cleaning of the grinder easier and more effective.

The ground-coffee outlet opening through which the ground coffee exits from the grinder is thus oriented in a non-radial direction.

In some embodiments the side surface ends into said ground-coffee chute. The length of the side surface is kept to a minimum value, consistently with the mechanical and design constraints. This avoids or reduces the formation of dead volumes where the ground coffee expelled from the grinding volume could accumulate.

In some embodiments, the ground-coffee chute has a circular or nearly circular cross-section. To reduce accumulation of ground coffee on the side surface of the ground-coffee chute, according to some embodiments an impact shield is arranged in the ground-coffee chute in front of the ground-coffee outlet. In some embodiments the impact shield has a substantially planar impact surface facing said ground-coffee outlet opening and can be advantageously orthogonal or substantially orthogonal to the side surface of the ground-coffee outlet opening. The speed direction of the ground coffee impinging against the impact shield will therefore be approximately at 90° with respect to the impact surface. This arrangement minimizes the tendency of the coffee powder to adhere on the impact surface and accumulate thereon.

In order to achieve better cleaning of the seat where the grinding wheels are arranged and to more efficiently remove ground coffee therefrom, according to some embodiments the rotating grinding wheel can be provided with radial projections configured and arranged for removing ground coffee collecting in the seat, between the cylindrical wall of said seat and the grinding wheels. The rotating projections move the ground coffee along the cylindrical surface until the ground coffee escapes through the ground-coffee outlet opening provided along the cylindrical seat.

According to a further aspect, a coffee machine is provided, comprising a coffee grinder as described above and an infusion unit arranged underneath said coffee grinder.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 8 illustrates a perspective view of the rotary grinding wheel and of the coffee beans stirrer arranged in the central aperture from which coffee beans are dispensed into the coffee grinder; and FIG. 9 schematically illustrates a coffee machine containing a coffee grinder.

DETAILED DESCRIPTION OF EMBODIMENTS OF THE INVENTION

Figure 1:
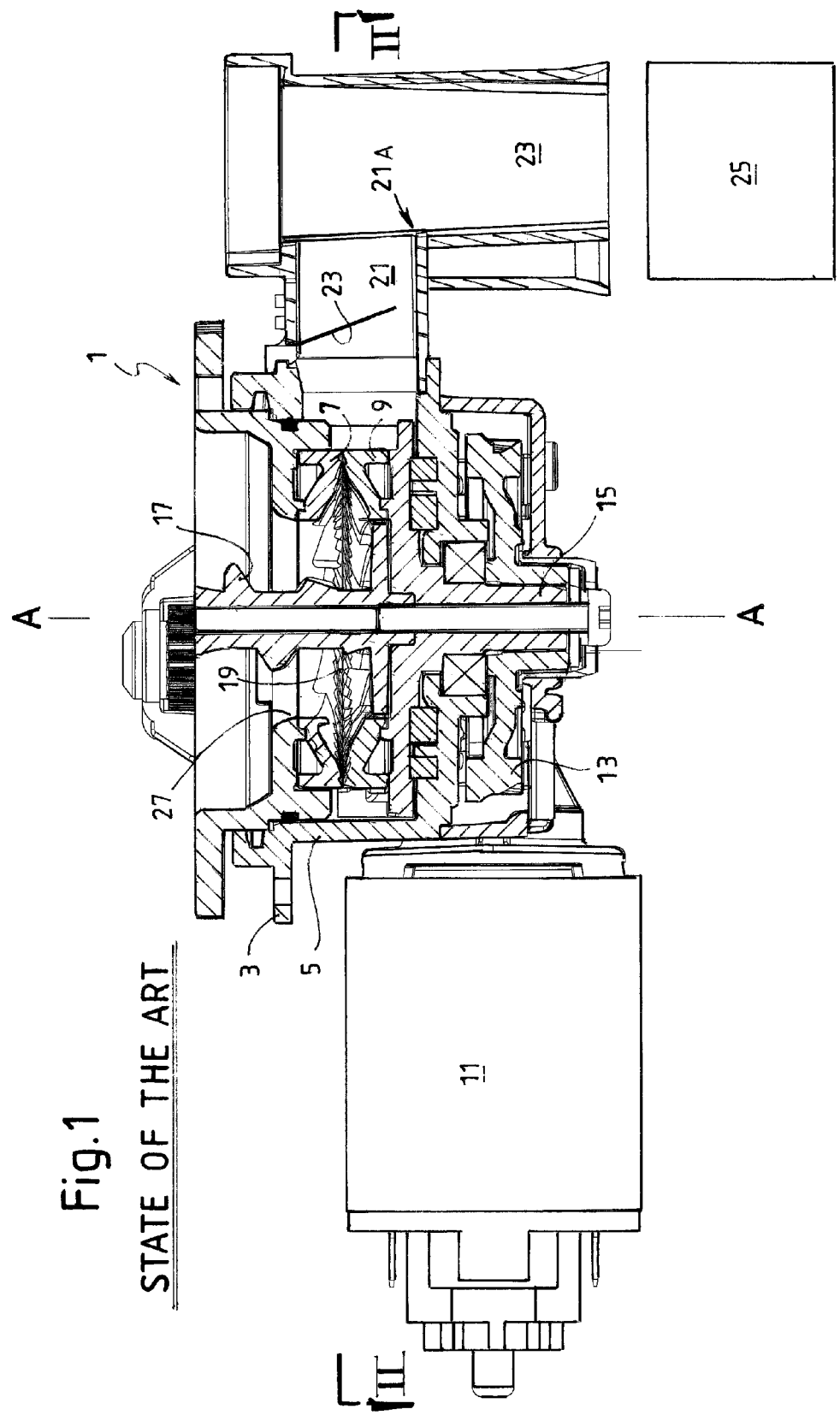
FIG. 1 illustrates a state of the art grinder according to a vertical section along a plane containing the rotation axis of the rotary grinding wheel.
Figure 2:
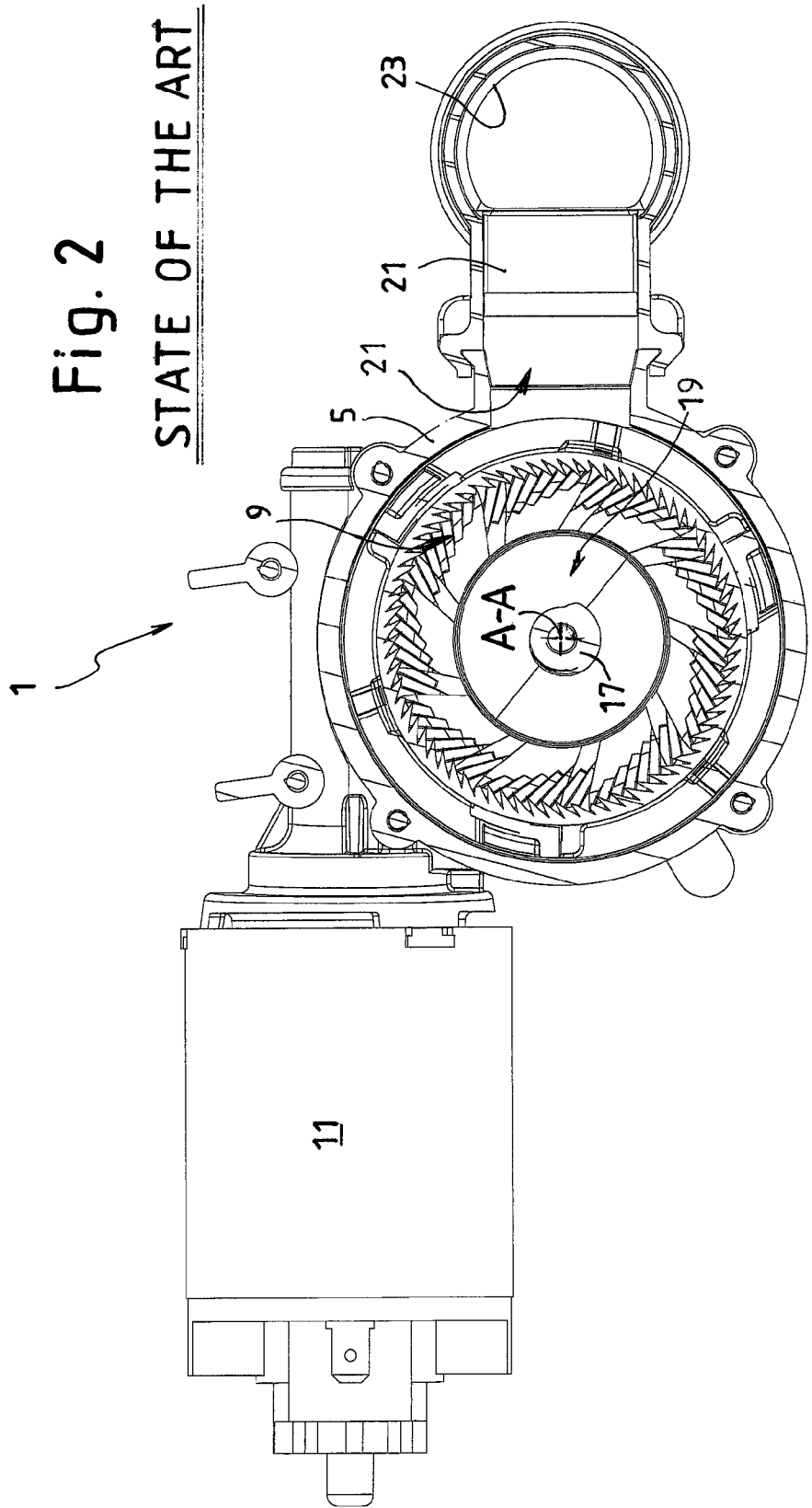
FIG. 2 illustrates a section according to line II-II in FIG. 1.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

FIGS. 3 to 7 illustrate an exemplary embodiment of a grinder according to the present disclosure. The grinder is labeled 50 as a whole and comprises a stationary bearing structure 51 defining a seat 53 housing a first grinding wheel 55 and a second grinding wheel 57. In the exemplary embodiment the first grinding wheel 55 is positioned above the second grinding wheel 57. The grinding wheels will therefore be referred to here below also as "the upper" grinding wheel 55 and "the lower" grinding wheel 57.

The grinder 50 can be housed in a coffee machine, e.g. an automatic coffee machine. FIG. 9 illustrates a schematic side view of a coffee machine 30 provided with a coffee grinder 50. The coffee machine 30 has a housing 31 and is provided with a coffee-bean container 32. An infusion unit, schematically shown at 74, is arranged under the coffee grinder 50. The coffee machine 30 is further provided with a dispensing spout 33 and a drip tray 34 positioned under the dispensing spout and provided with a grid 35 on which a container, such as a cup C can be placed for collecting coffee dispensed by the dispensing spout 33.

Figure 5:
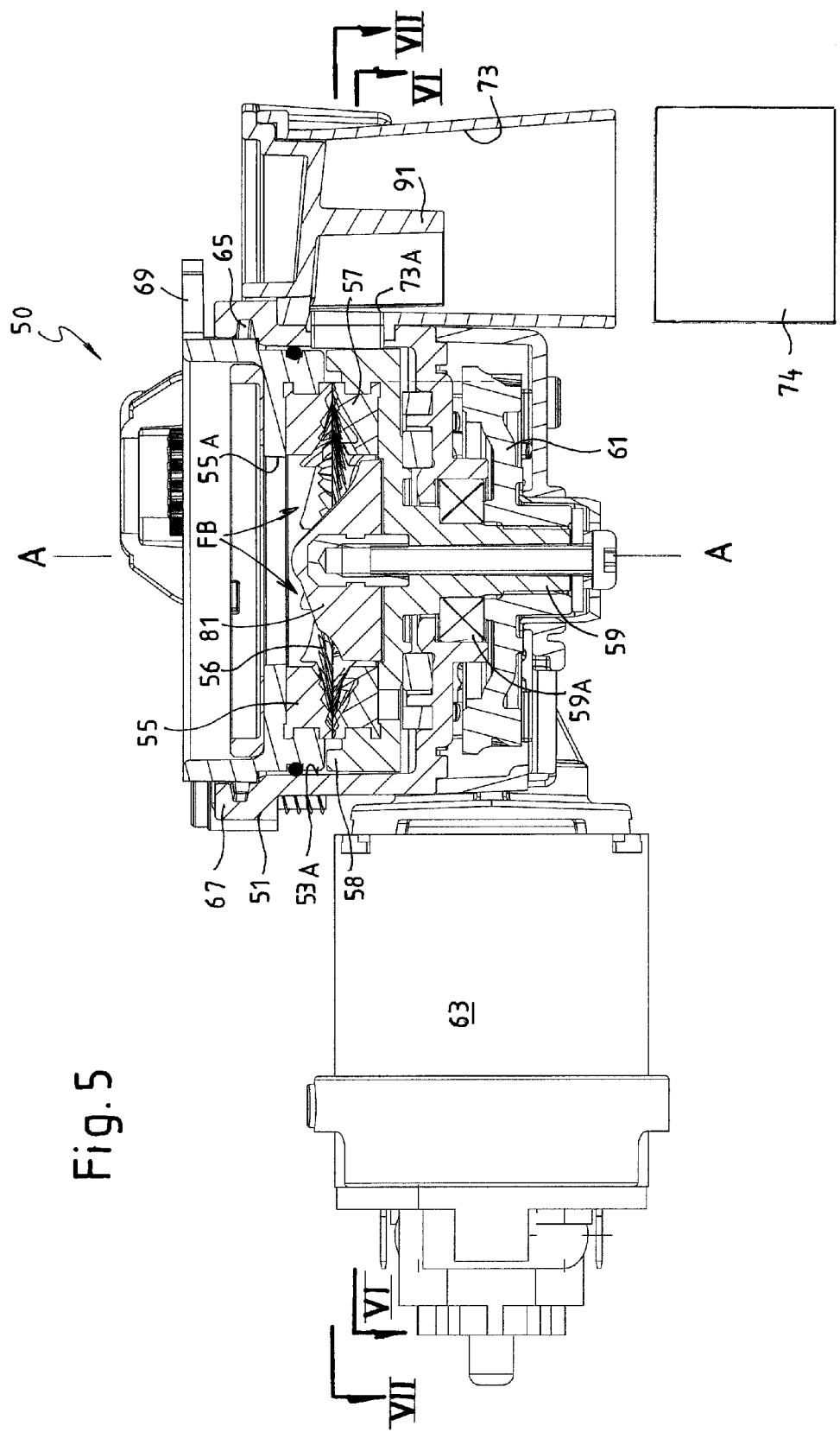
FIG. 5 illustrates a section according to line V-V in FIG. 4.

The first, upper grinding wheel 55 is supported stationarily in the seat 53. The second, lower grinding wheel 57 is rotatingly mounted in seat 53. For this purpose the grinding wheel 57 is constrained to a rotating shaft 59. In some exemplary embodiments the rotating shaft 59 can be integrally formed with the outer portion of the grinding wheel 57, as shown in FIG. 5. The rotating shaft 59 extends across an aperture provided in the bottom of the seat 53 and is supported by a bearing 59A (FIG. 5). The rotating shaft 59 is torsionally constrained to a gear 61, e.g. by means of a splined profile. An electric motor 63 drives into rotation the gear 61 and the grinding wheel 57, for example through a worm housed in a sleeve 85 (FIG. 3) and not shown.

As known to those skilled in the art the axial distance between the grinding wheels 55 and 57, i.e. the distance along the rotation axis of the second wheel 57, can be adjustable, e.g. to meet the consumer's needs. For example, the first, upper grinding wheel 55 can be axially movable with respect to the bearing structure 51 and have an adjustable axial distance from the second, lower grinding wheel 57. This can be obtained for example providing the upper grinding wheel with a male thread 65 engaging into a female thread 67, which can be integrally formed with, or constrained to the stationary bearing structure 51.

Figure 3:
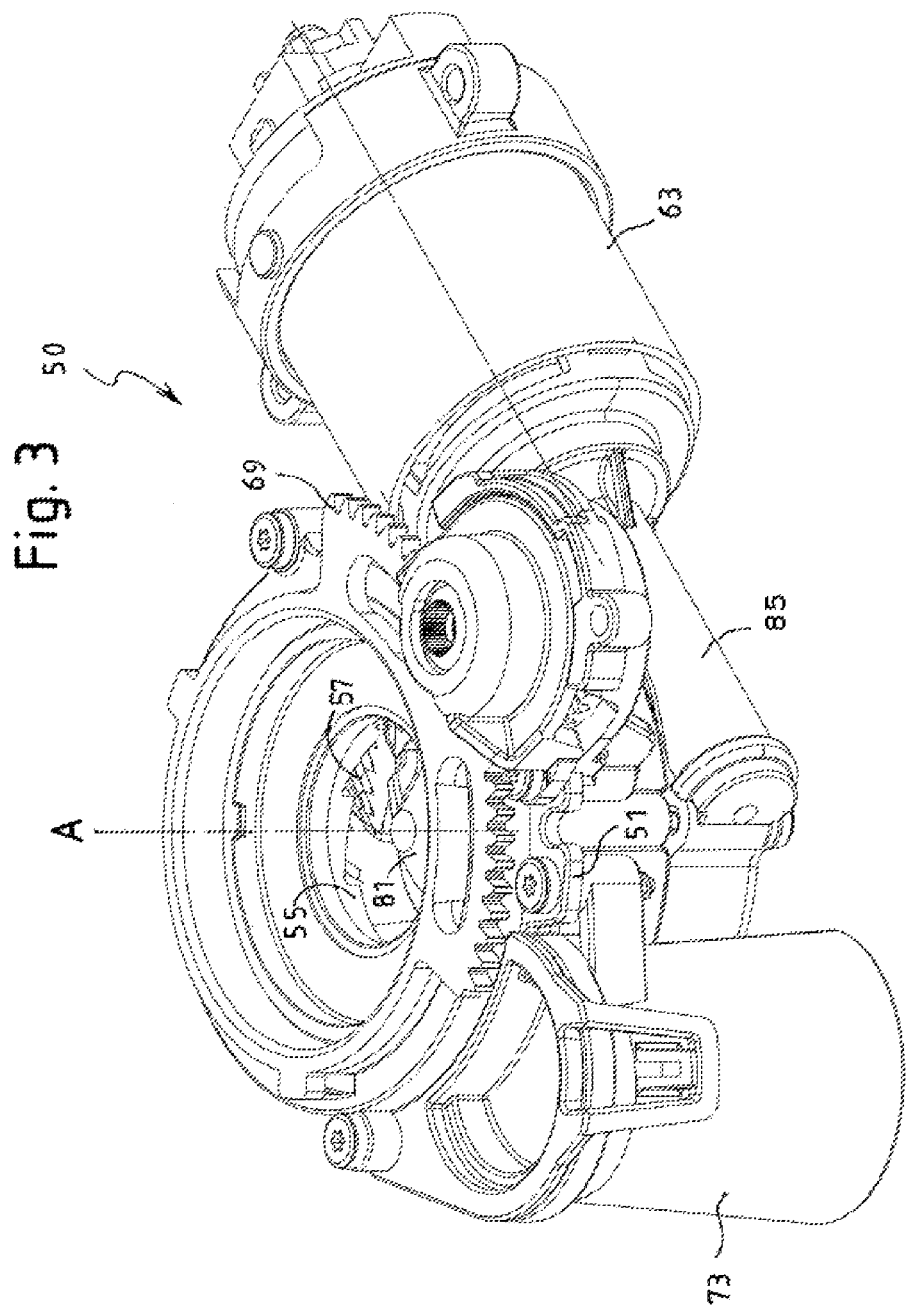
FIG. 3 illustrates a perspective view of a grinder according to the present disclosure.
Figure 4:
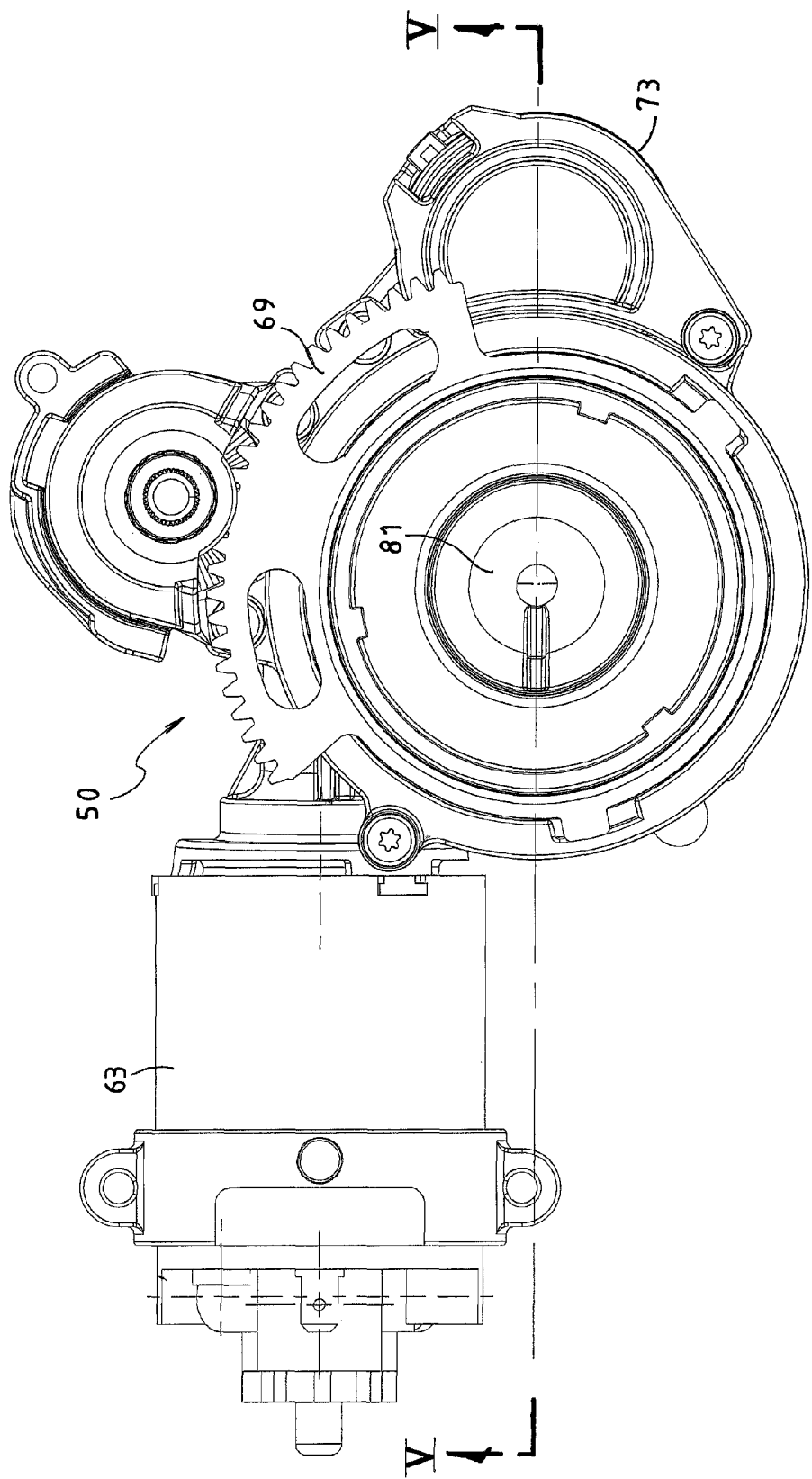
FIG. 4 illustrates a top view of the grinder of FIG. 3.

The upper grinding wheel 55 is constrained to a toothed sector 69 (see in particular FIGS. 3 and 4). Rotating the sector 69 around axis A-A, the first, stationary upper grinding wheels 55 can be rotated with respect to the stationary bearing structure 51. The threads 65 and 67 cause an axial displacement of the stationary, upper grinding wheel 55 with respect to the lower, rotary grinding wheel 57, thus adjusting the dimension of the ground coffee produced by the grinder 50.

Figure 6:
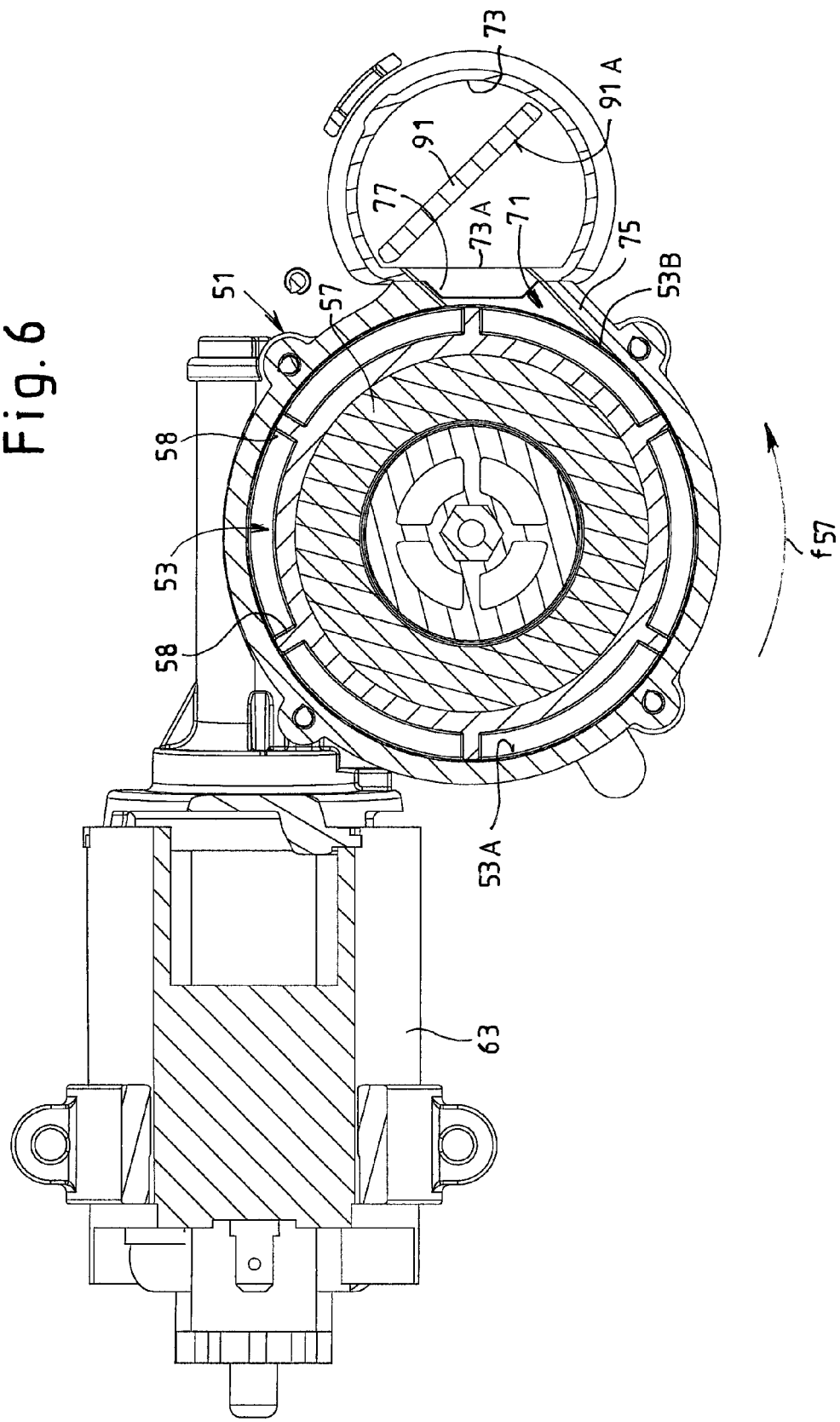
FIGS. 6 and 7 illustrate a section along lines VI-VI and VII-VII of FIG. 5 respectively.
Figure 7:
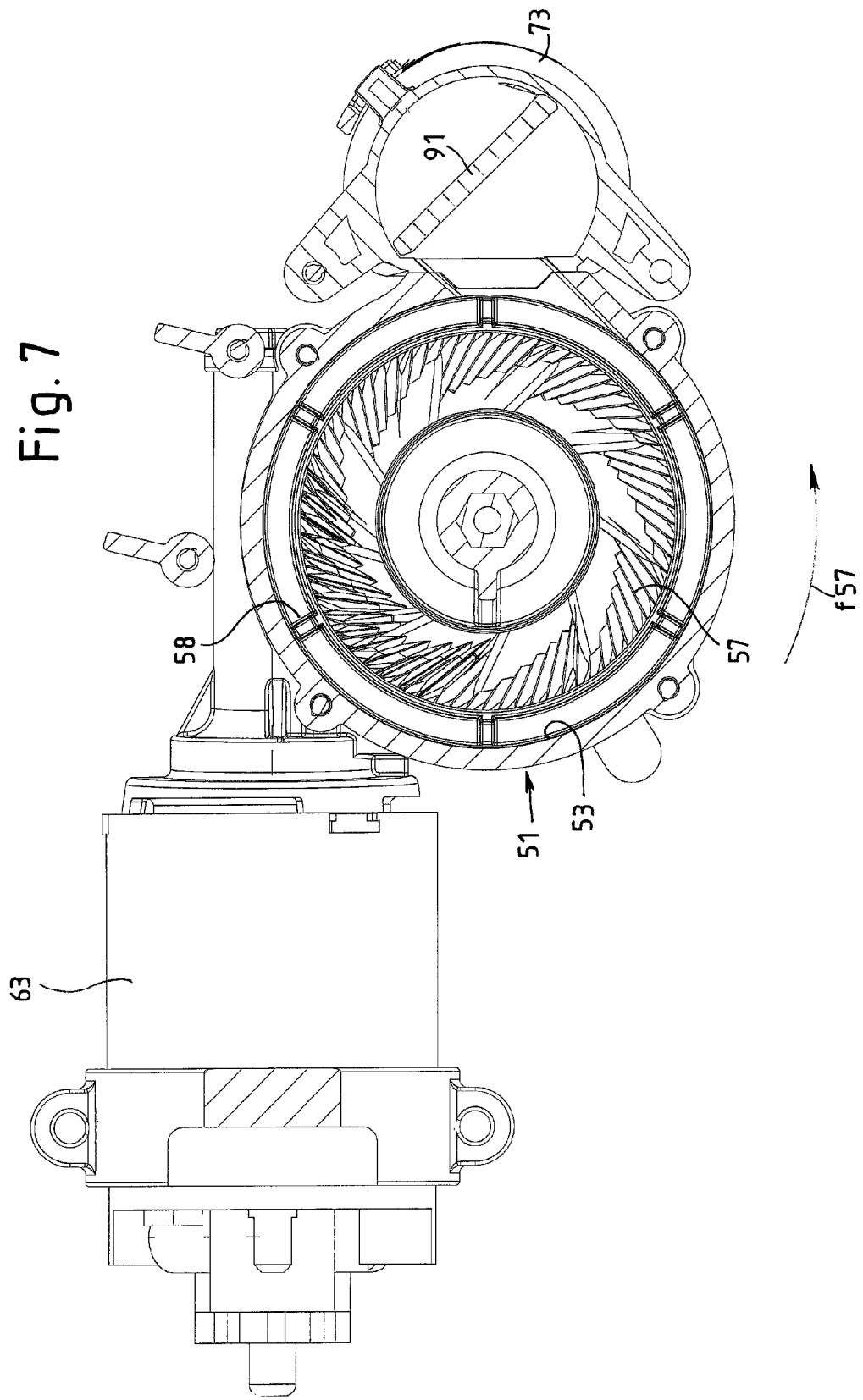

As best shown in FIGS. 6 and 7, the seat 53 is surrounded by a substantially cylindrical inner surface 53A having a diameter corresponding to or slightly larger than the diameter of the lower, rotary grinding wheel 57. In other embodiments the inner surface 53A can have a non-cylindrical shape, e.g. a frusto-conical shape, depending upon the peripheral shape of the grinding wheels. To allow rotation of the second, lower rotary grinding wheel 57 the cross section of the surface 53A is however circular.

The inner cylindrical surface 53A surrounds almost entirely the grinding wheels 55, 57, but is interrupted at a ground-coffee outlet 71, which is in communication with a ground-coffee chute 73. The ground-coffee chute 73 extends downwardly towards an infusion unit shown schematically at 74 in FIG. 5.

More specifically, in the embodiment illustrated in the drawings the substantially cylindrical surface 53A ends at 53B and merges with a side surface 75, which extends from 53B in a substantially tangential direction towards the ground-coffee chute 73. The surface 75 forms a continuation of the substantially cylindrical inner surface 53A of the seat 53. The side surface 75 ends at an edge 73A of the ground-coffee chute 73. The orientation of the surface 75 is concordant with the rotary speed of the second, lower grinding wheel 57, which rotates according to arrow f57 (see FIGS. 6 and 7), i.e. in a counter-clockwise direction in the drawings. The side surface 75, therefore, is oriented parallel to the speed vector of the outer periphery of the rotary grinding wheel 57 at 53B. In other embodiments the orientation of the side surface 75 can be nearly tangent or substantially tangent to the cylindrical surface 53A of the seat 53 in point 53B. For example, the side surface 75 could form a positive angle with respect to the tangent direction, being more open than the one depicted in the drawings. In FIG. 6 this would mean a side surface 75 forming a larger angle with the vertical direction than the one shown in FIG. 6. Alternatively, the side surface 75 could form a negative angle, i.e. it could be closer to the cylindrical surface 53A and closer to a vertical direction in FIG. 6, although this would be less advantageously since projection of the coffee out of the seat 53 would be less easy.

On the opposite side of the ground-coffee outlet 71 the wall forming the inner cylindrical surface 53 forms an edge 77, which is substantially parallel to the surface 75, so that the ground-coffee outlet 71 is delimited on both sides by two substantially rectilinear surfaces which extend parallel to one another in the direction of the speed vector of the periphery of grinding wheel 57 in the point 53B where the inner cylindrical surface 53B merges with surface 75.

A ground-coffee outlet 71 is thus obtained, which is oriented in a non-radial direction. More specifically the ground-coffee outlet 71 is oriented according to the direction of the speed of the ground-coffee particles projecting by centrifugal force from of the grinding volume 56 formed between the first, stationary grinding wheel 55 and the second, rotary grinding wheel 57. In actual fact, the ground-coffee particles exit the slit between the two grinding wheels 55, 57 with a speed vector having a tangential component and a radial component. The tangential component of the speed of said ground-coffee particles in point 53B is substantially parallel to the surface 75. The ground-coffee outlet 71 is thus oriented so as to facilitate the projection of the ground-coffee powder out of the grinding volume 56 through the ground-coffee aperture 71 into the ground-coffee chute 73.

During use coffee beans are fed into the grinding volume 56 through an aperture or passage 55A centrally provided in the first, upper grinding wheel 55. In FIG. 5 arrows FB indicate the direction of feeding of the coffee beans into the grinder 50. An agitator or stirrer 81 is mounted on shaft 59 for rotation along with the second, lower grinding wheel 57 under the control of motor 63. The agitator 81 facilitates feeding of the coffee beans into the grinding volume 56.

A metering device, schematically shown at 83 in FIG. 9, is provided to dispense a metered quantity of coffee beans to the grinder 50. As shown in FIG. 9, the metering device is arranged upstream of the grinder 50. The amount of coffee ground for each grinding cycle is therefore metered before grinding. The location of the metering device 83 shown in FIG. 9 is schematic and exemplary. Other locations for the metering device are possible. For example the metering device 83 can entirely or partly be located inside the coffee-beans container 32. Important is only that the coffee grinder 50 receives a limited, metered amount of coffee beans.

When the user starts a brewing cycle or an infusion cycle, the electric motor 63 is energized and the lower, rotary grinding wheel 57 starts rotating along with the agitator 81, causing the metered coffee beans to enter the grinding volume 56. The two grinding wheels 55 and 57 crash the coffee beans and transform them into ground coffee in powdery form, which is ejected out of the grinding volume 56 and of the seat 53 through the ground-coffee outlet 71, the orientation of which facilitates the projection of the ground coffee into the ground-coffee chute 73.

The motor 63 is de-energized and the rotation of the lower grinding wheels 57 is stopped when the metered amount of coffee beans dispensed to the grinder 50 has been entirely crashed and ground into powder coffee, and the ground coffee has been entirely expelled through the ground coffee outlet 71. This can be achieved by setting a sufficiently long grinding time, so that the entire dose of metered coffee beans will be completely ground once the grinding time has elapsed. Since the amount of coffee to prepare a coffee cup is known and varies only slightly around a given value of approximately 8 g, setting the grinding time is relatively easy. In order to ensure that at the end of the grinding process the grinding volume 56 is substantially free of coffee residues, the grinding time can be set to a value which is sufficiently higher than the time strictly required to actually grind the maximum possible amount of coffee beans metered for one grinding cycle. A cleaning step is performed at the end of each grinding process. During the cleaning step the second, lower grinding wheel 57 will rotate with virtually no coffee beans in the grinding volume 56. Continued rotation during this extra-time ensures that residues of crashed coffee beans or coffee powder will be expelled by centrifugal force through the non-radially oriented ground-coffee outlet 71.

In other embodiments, the duration of the grinding process can be set in terms of number of revolutions of the rotary grinding wheel. The number extra revolutions can be added to the number of revolutions required to grind the metered coffee beans, to achieve the above mentioned cleaning effect.

In some embodiments, the grinding time or the number of revolutions can be determined each time based on the actually metered quantity of coffee beans. For example, if the infusion unit allows to prepare more than one cup of coffee at a time, the user can set the number of coffee cups, e.g. 1 or 2 cups, and an electronic control unit can determine the grinding time or the number of revolutions required to entirely grind the metered amount of coffee beans and to clean the grinder.

In yet further embodiments, means can be adopted to detect the actual exhaustion of the coffee in the coffee grinder 50. For example, the noise or the vibrations produced by the grinder can be detected, or the power absorbed by the electric motor 63 can be measured. These parameters change as the torque required to rotate the rotary grinding wheel drops due to completion of the grinding process. The information thus obtained can be used by a control unit, to stop the grinder after a sufficient extra rotation time or extra number of turns of the grinding wheel, to perform cleaning of the grinder.

In some embodiments the second, rotary grinding wheel 57 is provided with radially extending projections 58 (see in particular FIGS. 6 and 8). The projections 58 extend radially to an extent sufficient to almost touch or brush the inner cylindrical surface 53A of the seat 53. The radial projections 58 operate as scrapers along the circumference of the seat 53 to remove any coffee powder residues from the inner surface 53A and force them to escape by centrifugal force through the ground-coffee outlet 71.

As best seen in FIGS. 5 and 8, the radial projections 58 extend axially from a shoulder 60 beyond the upper edge 57A (FIG. 8) of the lower rotary grinding wheel 57. In this manner the radial projections 58 span across the slit formed between the upper, stationary grinding wheel 55 and the lower rotary grinding wheel 57, the ground coffee powder being projected out of the grinding volume 56 through said slit. The axial dimension of radial projections 58 is therefore sufficient to remove coffee residues deposited along the inner cylindrical surface 53A of the seat 53 along and in front of the slit between the two grinding wheels 55 and 57.

In an improved embodiment, measures are met to further remove potential residues of ground coffee also in the ground coffee chute 73. As best shown in FIGS. 5, 6 and 7 the ground coffee chute 73 has a substantially cylindrical or conical shape and can have an approximately almost circular cross-section. This shape provides for an improved distribution of the ground coffee in the infusion unit 74. The width of the ground coffee chute 73 is therefore such that the inner surface thereof opposing the ground-coffee outlet 71 is set at a certain distance therefrom. Ground coffee projecting by centrifugal force from the seat 53 into the ground-coffee chute 73 would tend to adhere to the inner surface of the ground-coffee chute 73, opposite the ground-coffee outlet 71, mainly due to electrostatic charges and limited kinetic energy of the ground coffee reaching the inner surface of the ground-coffee chute. Most of the kinetic energy of the ground coffee is dissipated along the path traveled by the coffee powder from the grinding wheels to the inner surface of the ground-coffee chute.

Ground coffee, which adheres to the inner surface of the ground-coffee chute 73, will contaminate the ground coffee produced in the subsequent grinding cycle. To reduce or alleviate this problem, an impact shield 91 is arranged inside the ground-coffee chute 73. In some embodiments the impact shield 91 is substantially planar and has a front planar surface 91A facing the ground-coffee outlet 71. In some embodiments the planar surface 91A is oriented substantially orthogonal to the surface 75.

The impact shield 91 is arranged at a distance from the ground-coffee outlet 71, which is substantially smaller than the distance between said ground-coffee outlet 71 and the substantially cylindrical surface of the ground-coffee chute 73 opposite the ground-coffee outlet 71. Therefore the ground coffee striking against the impact surface 91A of the impact shield 91 has a higher kinetic energy than that which the ground coffee would have if it were to directly impact against the opposing inner surface portion of the ground-coffee chute 73. The higher kinetic energy of the ground coffee impinging against the impact surface 91A reduces the amount of ground coffee, which tends to stick on said surface 91A by effect of mechanical or electrostatic forces.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A coffee grinder comprising:
a first grinding wheel and a second grinding wheel arranged in a seat delimited by a side wall having a circular cross section;
a grinding volume formed between the first grinding wheel and the second grinding wheel;
a motor for rotating the first grinding wheel;
a ground-coffee outlet opening in the side wall;
wherein the motor is controlled to rotate the first grinding wheel with respect to the second grinding wheel so that coffee beans introduced in the grinding volume are ground, and to continue rotating the first grinding wheel after grinding of the coffee beans, thus cleaning the grinding volume and the seat, wherein the ground-coffee outlet opening has a side surface that extends from the side wall for projection of the ground coffee into a ground-coffee chute;
wherein the coffee grinder further comprises means to detect actual exhaustion of the coffee beans in the grinding volume; and
a control unit for controlling the motor, wherein the control unit is configured to stop rotating the first grinding wheel after a predetermined extra rotation time or extra number of turns after exhaustion is detected to perform the cleaning of the grinding volume and the seat.

2. The coffee grinder according to claim 1, wherein the side surface of the ground-coffee outlet opening forms with a geometrical tangent direction to the side wall at the point an angle between −10° and +40° and preferably between −5° and +20° and even more preferably between −5° and +10°.

3. The coffee grinder according to claim 1, wherein the side surface extends from the side wall to the ground-coffee chute.

4. The coffee grinder according to claim 1, wherein the ground-coffee chute has a nearly circular cross-section.

5. The coffee grinder according to claim 4, comprising an impact shield arranged in the ground-coffee chute for reducing a velocity of the ground coffee upon projection from the ground-coffee outlet opening into the ground-coffee chute.

6. The coffee grinder according to claim 5, wherein the impact shield has a substantially planar impact surface facing the ground-coffee outlet opening.

7. The coffee grinder according to claim 5, wherein the impact shield has an impact surface substantially orthogonal to the side surface of the ground-coffee outlet opening.

8. The coffee grinder according to claim 1, wherein the first grinding wheel is provided with radial projections configured and arranged for removing ground coffee collecting in the seat, between the side wall of the seat and the first grinding wheel and the second grinding wheel, and for conveying the ground coffee towards the ground-coffee outlet.

9. The coffee grinder according to claim 8, wherein the radial projections extend from an annular shoulder of the first grinding wheel in an axial direction beyond a grinding surface of the rotating grinding wheel to span across a slit between the first grinding wheel and the second grinding wheel.

10. A coffee machine comprising a coffee grinder according to claim 1 and an infusion unit arranged underneath the coffee grinder.

11. The coffee machine according to claim 10, comprising a coffee-beans metering device arranged above the coffee grinder.

12. The coffee grinder according to claim 1, wherein the ground-coffee chute has a conical shape with a top width and bottom width, wherein the bottom width is wider than the top width.

13. A method for grinding coffee beans in a coffee machine, comprising the steps of:
arranging a first grinding wheel and a second grinding wheel in a seat delimited by a side wall having a circular cross section and a ground-coffee outlet opening with a side surface which extends from the side wall of the seat and oriented to facilitate projection of ground coffee from a grinding volume formed between the first grinding wheel and the second grinding wheel and from the seat by effect of centrifugal force into a ground-coffee chute; the first grinding wheel rotating with respect to the second grinding wheel;
introducing coffee beans into the grinding volume;
grinding the coffee beans by rotating the first grinding wheel with respect to the second grinding wheel;
detecting actual exhaustion of the coffee beans in the grinding volume;
continuing rotation of the first grinding wheel with respect to the second grinding wheel, thus cleaning the grinding volume and the seat removing ground coffee therefrom by centrifugal force; and
stopping rotation of the first grinding wheel after a predetermined extra rotation time or extra number of turns after exhaustion is detected to perform the cleaning of the grinding volume and the seat.

14. The method according to claim 13, further comprising the steps of feeding a metered amount of coffee beans in the grinding volume and rotating the first grinding wheel and the second grinding wheel one with respect to the other to grind the metered amount of coffee beans.

15. The method according to claim 13, further comprising the step of detecting exhaustion of the coffee beans in the grinding volume and continuing rotation of the grinding wheels one with respect to the other for a time interval after exhaustion of the coffee beans.

* * * * *